INVENTOR
Paul Christiaan Van Der Willigen
BY

AGENT

Patented June 23, 1953

2,643,319

UNITED STATES PATENT OFFICE 2,643,319

METHOD OF ELECTRIC ARC WELDING

Paul Christiaan van der Willigen, Eindhoven, Netherlands, assignor to Hartford National Bank and Trust Company, Hartford, Conn., as trustee Application December 24, 1948, Serial No. 67,138
In the Netherlands February 9, 1948

10 Claims. (Cl. 219—10)

The invention relates to a method of electric arc-welding without using a bare welding wire or a coated welding rod, but in which an arc is struck directly between the work pieces to be joined with the use of a semi-conducting member which is sufficiently conductive to initiate the arc and establishes electric contact between the work pieces to be joined which are slightly spaced apart by this semi-conducting body. In this method the welding arc is only of very short duration, it being of importance that one work piece contacts with the other after a predetermined time.

According to the invention, this predetermined time after which the work pieces contact with one another, after initiation of the arc, is determined by deformation of an insulating slag-forming body shortly after initiation of the arc.

The invention is particularly of importance for joining a rod-shaped metal workpiece, for example a bolt, to a larger work piece such as a metal plate. To this end, according to the invention, the rod-shaped work piece is rested on a semi-conducting body which, together with the end of the rod-shaped work piece, is placed in the cavity of an insulating slag-forming supporting body, whereupon the arc is struck.

A robust welding joint is promoted if the semi-conducting body and the insulating slag-forming body both consist of inorganic material previously degassed by sintering. As a rule, the semi-conducting body will also be slag-forming to a greater or lesser degree.

As will be shown more fully hereinafter by giving an example, the arc is readily struck at exactly the right spot owing to the ignition through the semiconducting body, the insulating, slag-forming supporting body being utilised for preventing excessively rapid extinction of the arc, in which case the work pieces would not be satisfactorily welded together. The invention enables easy control of the very short duration, i. e. 0.5 to 2 seconds, of the arc by a suitable choice of the size of the insulating, slag-forming supporting body, so that there is no need of using a more or less complicated control device.

In order that the invention may be more clearly understood and readily carried into effect, it will now be described more fully with reference to the accompanying drawing illustrating the advantage of using an auxiliary member for holding a work piece temporarily in place.

Figure 1:
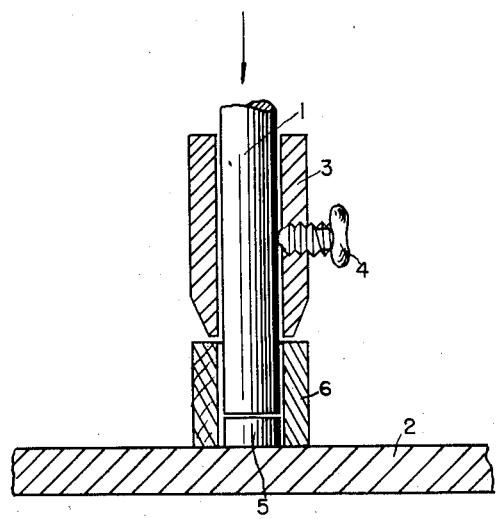
Fig. 1 is a view, partly in section and partly in elevation illustrating the method of arc-welding embodying the present invention.

In Fig. 1 the reference numeral 1 designates an iron bolt to be welded to an iron plate 2. The bolt is clamped in a metal, for example brass, holder 3 by means of a locking screw 4. The holder 3 is subject to spring pressure in the direction of the arrow. The end of the bolt 1 to be welded rests on a semi-conducting member 5 surrounded by an insulating slag-forming body 6, on which the holder 3 comes to rest for a short time after the semi-conducting body 5 has been melted. A suitable composition of the semi-conducting member 5 is: 54% by weight of iron powder, 6% by weight of ferro-manganese (80% Mn), ferro-silicon (45% Si) and ferro-titane (25% Ti), 13% by weight of calcium carbonate, 13% by weight of calcium fluoride and 14% by weight of bentonite. The insulating body 6 may consist of 14% by weight of ferro-manganeses (80% Mn), ferro-silicon (45% Si) and ferro-titane (25% Ti), 31% by weight of calcium carbonate, 31% by weight of calcium fluoride and 24% by weight of bentonite. The bodies 5 and 6 are previously degassed by sintering at 900° C. with the exclusion of air. After connecting the bolt 1 and the plate 2 to the secondary winding of a welding transformer and switching on the current, the arc is initiated through the semi-conducting member 5 and struck in a very short time between the contact points of the bolt 1 and the plate 2 with the member 5. The member 5 and partly also the body 6 melt in succession and at the instant of sufficient deformation of the body 6 i. e. after approximately 1 second, the spring pressure is capable of pressing the bolt 1 on the plate 2 and the arc current passes over into a short-circuiting current which is then switched off.

It is pointed out that the embodiment as described, in which as an auxiliary member a holder is used in which the bolt is secured, is preferred. As an alternative, however, the desired junction between the bolt and the said supporting member may be obtained by providing the bolt with a protruding part, for example a thickened part with which the bolt is rested on the supporting body.

Figure 2:
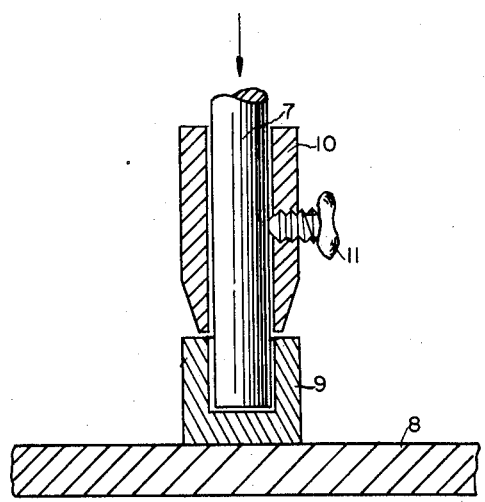
Fig. 2 is a view of another embodiment thereof, partly in section and partly in elevation.

Finally it is to be noted that the use of an auxiliary member for holding one of the work pieces to be welded temporarily in place not always requires the presence of a bipartite inorganic mass between the work pieces, though this combination is to be preferred. Fig. 2 shows, by way of example, that between the bolt 7 and the plate 8 provision is made of the semi-conducting, slag-forming body 9 having the same composition as that of the aforesaid member 5. The reference numeral 10 designates the holder subjected to spring pressure and comprising a locking screw 11. The holder 10 rests on the body 9, the size of which determines the instant at which the body 9, owing to melting, no longer supports the auxiliary member 10 with the bolt 7, and this bolt 7 is joined to the iron plate 8.

What I claim is:

1. A method of joining two metallic work-pieces by electric arc-welding, comprising the steps of: urging one of the said metallic work-pieces towards abutting relationship with the other said metallic work-piece, placing a slag-forming body between said metallic work-pieces with one portion thereof abutting said other metallic work-piece at a region closely adjacent the welding contact region thereof and another portion of said slag-forming body abutting a part fixed for movement with said urged metallic work-piece at a region spaced from the welding contact region thereof thus keeping said work-pieces spaced apart, passing an electric current through said metallic work-pieces of a sufficient strength to initiate a welding arc between said work-pieces; continuing said electric current and resulting welding arc between said metallic work-pieces until said slag-forming body begins to melt and deform to so permit approach of said urged metallic work-piece towards said other metallic work-piece and then finally, upon sufficient melting and deformation of said slag-forming body, permitting said welding contact region of said urged work-piece to contact said welding contact region of said other work-piece after a predetermined period of time subsequent to initiation of the welding arc.

2. A method of joining two metallic work-pieces by electric arc-welding, comprising the steps of: urging one of the said metallic work-pieces towards abutting relationship with the other said metallic work-piece, placing a slag-forming body between said metallic work-pieces with one portion thereof abutting said other metallic work-piece at a region closely adjacent the welding contact region thereof and another portion of said slag-forming body abutting a part fixed for movement with said urged metallic work-piece at a region spaced from the welding contact region thereof, locating a semi-conducting body in the space between said work-pieces thus keeping said work-pieces spaced apart, passing an electric current through said metallic work-pieces and said semi-conducting body of a sufficient strength to initiate a welding arc between said work-pieces; continuing said electric current and resulting welding arc between said metallic work-pieces until said semi-conducting body melts and said slag-forming body begins to melt and deform to so permit approach of said urged metallic work-piece towards said other metallic work-piece and then finally, upon sufficient melting and deformation of said slag-forming body, permitting said welding contact region of said urged work-piece to contact said welding contact region of said other work-piece after a predetermined period of time subsequent to initiation of the welding arc.

3. A method of joining two metallic work-pieces by electric arc-welding, comprising the steps of: urging one of the said metallic work-pieces towards abutting relationship with the other said metallic work-piece, placing a slag-forming body between said metallic work-pieces with one portion thereof abutting said other metallic work-piece at a region closely adjacent the welding contact region thereof and another portion of said slag-forming body abutting a part fixed for movement with said urged metallic work-piece at a region spaced from the welding contact region thereof, locating a semi-conducting body consisting of inorganic material previously degassed by sintering between said work-pieces thus keeping said work-pieces spaced apart, passing an electric current through said metallic work-pieces and said semi-conducting body of a sufficient strength to initiate a welding arc between said work-pieces; continuing said electric current and resulting welding arc between said metallic work-pieces until said semi-conducting body melts and said slag-forming body begins to melt and deform to so permit approach of said urged metallic work-piece towards said other metallic work-piece and then finally, upon sufficient melting and deformation of said slag-forming body, permitting said welding contact region of said urged work-piece to contact said welding contact region of said other work-piece after a predetermined period of time subsequent to initiation of the welding arc.

4. An electric arc stud-welding system comprising in combination: means for holding a metallic bolt in welding relationship with a metallic plate, means biasing said bolt holder means towards end-on abutment with a surface of the metallic plate to which the bolt is to be welded, a semi-conducting body positioned adjacent said holder means and adapted to be interposed between the metallic bolt held in said holder means and the metallic plate to which the bolt is to be welded, and other means operatively associated with said holder means for limiting the said biased movement thereof, said other means comprising a collapsible, insulating slag-forming body surrounding said semi-conducting body and adapted to surround a portion of a bolt positioned in the holder means.

5. An electric arc welding system comprising in combination a metallic bolt, a metallic plate, means biasing said metallic bolt towards end on abutment with a surface of said metallic plate including a spring and a holder, a semi-conducting body interposed between said metallic bolt and said metallic plate and spacing said bolt and said plate apart, and means for limiting movement of said bolt towards said plate comprising a collapsible, insulating slag-forming body surrounding both said semi-conducting body and a portion of said bolt adjacent said body, and abutment means on said bolt for engaging said slag-forming body.

6. An electric arc stud-welding system comprising in combination: means for holding a metallic bolt in welding relationship with a metallic plate, means biasing said bolt holder means towards end-on abutment with a surface of the metallic plate to which the bolt is to be welded, a collapsible, semi-conducting slag-forming cup-shaped body positioned in abutment with said holder means and adapted to receive the end of a metallic bolt held in said holder means and to likewise abut a metallic plate to which the bolt is to be welded.

7. An electric arc welding system comprising in combination a first metallic bolt, a metallic plate, means biasing said metallic bolt towards end on abutment with a surface of said metallic plate including a spring and a holder, a collapsible, semi-conducting slag-forming cup-shaped member positioned at the end of said bolt so as to be interposed between said metallic bolt and said metallic plate, and abutment means on said bolt and positioned in engageable relationship with a rim portion of said cup-shaped member for spacing said bolt and plate apart.

8. A method of electric arc stud-welding, comprising the steps of: urging a metallic stud positioned in a holder towards abutting relationship with the surface of a metallic work-piece, placing a hollow, substantially cylindrical slag-forming body between said metallic stud and said metallic work-piece surrounding said stud with one portion of said slag-forming body abutting said metallic work-piece at a region closely adjacent the welding contact region thereof and another portion of said slag-forming body abutting said holder thus keeping said stud and said work-piece spaced apart, passing an electric current through said stud and said work-piece of a sufficient strength to initiate a welding arc therebetween; continuing said electric current and resulting welding arc between said stud and said work-piece until said slag-forming body begins to melt and deform to so permit approach of said urged stud towards said other metallic work-piece and then finally, upon sufficient melting and deformation of said slag-forming body, permitting said welding contact region of said urged stud to contact said welding contact region of said other work-piece after a predetermined period of time subsequent to initiation of the welding arc.

9. A method of electric arc stud-welding, comprising the steps of: urging a metallic stud positioned in a holder towards abutting relationship with the surface of a metallic work-piece, placing an open-ended, substantially cylindrical slag-forming body between said metallic stud and said metallic work-piece and surrounding said stud, said slag-forming body having one portion abutting said metallic work-piece at a region closely adjacent the welding contact region thereof and another portion of said slag-forming body abutting said holder, locating a semi-conducting body in the space between said stud and said work-piece and confined within said slag-forming body thus keeping said stud and said work-piece spaced apart, passing an electric current through said stud and said work-piece of a sufficient strength to initiate a welding arc therebetween; continuing said electric current and resulting welding arc between said stud and said work-piece until said slag-forming body begins to melt and deform to so permit approach of said urged stud towards said other metallic work-piece and then finally, upon sufficient melting and deformation of said slag-forming body, permitting said welding contact region of said urged stud to contact said welding contact region of said other work-piece after a predetermined period of time subsequent to initiation of the welding arc.

10. A method of electric arc stud-welding, comprising the steps of: urging a metallic stud, having an abutment thereon positioned away from the end thereof, the stud being positioned in a holder towards abutting relationship with the surface of a metallic work-piece, placing an open-ended, substantially cylindrical slag-forming body between said metallic stud and said metallic work-piece and surrounding said stud, said slag-forming body having one portion abutting said metallic work-piece at a region closely adjacent the welding contact region thereof and another portion of said slag-forming body abutting said holder, locating a semi-conducting body in the space between said stud and said work-piece and confined within said slag-forming body thus keeping said stud and said work-piece spaced apart, passing an electric current through said stud and said work-piece of a sufficient strength to initiate a welding arc therebetween; continuing said electric current and resulting welding arc between said stud and said work-piece until said slag-forming body begins to melt and deform to so permit approach of said urged stud towards said other metallic work-piece and then finally, upon sufficient melting and deformation of said slag-forming body, permitting said welding contact region of said urged stud to contact said welding contact region of said other work-piece after a predetermined period of time subsequent to initiation of the welding arc.

PAUL CHRISTIAAN van der WILLIGEN.

References Cited in the file of this patent

UNITED STATES PATENTS

| Number | Name | Date |
|---|---|---|
| Re. 22,108 | Crecca | June 9, 1942 |
| 2,043,960 | Jones et al. | June 9, 1936 |
| 2,057,670 | Crecca et al. | Oct. 20, 1936 |
| 2,315,502 | Crecca et al. | Apr. 6, 1943 |
| 2,326,865 | Kennedy | Aug. 17, 1943 |
| 2,370,100 | White | Feb. 20, 1945 |
| 2,384,403 | Somers | Sept. 4, 1945 |
| 2,429,175 | Van Der Willigen et al. | Oct. 14, 1947 |
| 2,474,531 | Keir et al. | June 28, 1949 |
| 2,510,000 | Van Der Willigen et al. | May 30, 1950 |
| 2,518,463 | Graham | Aug. 15, 1950 |

FOREIGN PATENTS

| Number | Country | Date |
|---|---|---|
| 365,302 | Italy | Nov. 30, 1938 |
| 497,133 | Great Britain | Dec. 13, 1938 |
| 501,721 | Great Britain | Mar. 3, 1939 |